(12) United States Patent
Gindre et al.

(10) Patent No.: US 9,368,145 B2
(45) Date of Patent: Jun. 14, 2016

(54) REVERSIBLE RECORDING MEDIUM BASED ON OPTICAL STORAGE OF INFORMATION, METHOD OF REVERSIBLE RECORDING ON SUCH A MEDIUM

(75) Inventors: Denis Gindre, Angers (FR); Marc Salle, Avrille (FR); Oksana Krupka, Kyiv (UA); Konstantinos Iliopoulos, Angers (FR)

(73) Assignees: CENTRE NATIONAL DE LA RECHERCHE SCIENTIFIQUE - CNRS, Paris (FR); UNIVERSITE D'ANGERS, Angers (FR)

( * ) Notice: Subject to any disclaimer, the term of this patent is extended or adjusted under 35 U.S.C. 154(b) by 86 days.

(21) Appl. No.: 13/640,125

(22) PCT Filed: Apr. 5, 2011

(86) PCT No.: PCT/FR2011/050763
§ 371 (c)(1),
(2), (4) Date: Oct. 9, 2012

(87) PCT Pub. No.: WO2011/124840
PCT Pub. Date: Oct. 13, 2011

(65) Prior Publication Data
US 2013/0033975 A1     Feb. 7, 2013

(30) Foreign Application Priority Data

Apr. 7, 2010   (FR) ..................................... 10 52635

(51) Int. Cl.
*G11B 7/24* (2013.01)
*G11B 7/245* (2006.01)
(Continued)

(52) U.S. Cl.
CPC ................. *G11B 7/245* (2013.01); *B82Y 10/00* (2013.01); *G11B 7/006* (2013.01); *G11B 7/246* (2013.01); *G11B 7/25* (2013.01); *G11B 2007/0009* (2013.01)

(58) Field of Classification Search
None
See application file for complete search history.

(56) References Cited

U.S. PATENT DOCUMENTS 3,453,110 A * 7/1969 Delzenne et al. .......... 430/287.1
5,286,803 A * 2/1994 Lindsay et al. ............ 525/329.7
(Continued)

FOREIGN PATENT DOCUMENTS

FR        2900762        11/2007
JP        02-043521    *  2/1990
(Continued)

OTHER PUBLICATIONS

Chen et al., "Copolymers derived from 7-acryloyloxy-4-methylcoumarin and acrylates: 2. Reversible photocrosslinking and photocleavage", Polym. vol. 37(20) pp. 4481-4486 (1996).*
Chung et al., "Preparation of photocrosslinkable polymers having coumarin side groups and their properties", Kor. Polym. J., vol. 3(1) pp. 12-18 (1995).*
(Continued)

*Primary Examiner* — Martin Angebranndt
(74) *Attorney, Agent, or Firm* — Young & Thompson

(57) ABSTRACT

A reversible recording medium based on optical storage of at least one item of information within a support material, includes at least one layer of support material having: base molecules able to take, in a local zone, a first collective state of molecules able to generate a first signal of second harmonic characteristic of this first collective state of molecules when excited by electromagnetic reading radiation; the base molecules having the first collective state of molecules able to transform, at least in part, into transformed molecules so as to pass to a second collective state of molecules when excited by electromagnetic writing radiation, the molecules having the second collective state of molecules able to generate a second signal of second harmonic characteristic of this second collective state of molecules when excited by the electromagnetic reading radiation. The molecules exhibit a molecular structure based on a coumarin skeleton of Formula (I).

11 Claims, 8 Drawing Sheets

(51) Int. Cl.
  *B82Y 10/00*   (2011.01)
  *G11B 7/006*   (2006.01)
  *G11B 7/246*   (2013.01)
  *G11B 7/25*    (2006.01)
  *G11B 7/00*    (2006.01)

(56) References Cited

U.S. PATENT DOCUMENTS

| | | | |
|---|---|---|---|
| 6,045,888 A * | 4/2000 | Chen et al. | 428/64.1 |
| 2008/0021166 A1 * | 1/2008 | Tong et al. | 525/241 |
| 2011/0019511 A1 * | 1/2011 | Fort et al. | 369/13.14 |
| 2011/0251364 A1 * | 10/2011 | Anthamatten et al. | 526/258 |

FOREIGN PATENT DOCUMENTS

| | | | |
|---|---|---|---|
| JP | 2000-226415 | * | 8/2000 |
| JP | 2005-092074 | | 4/2005 |
| JP | 2008-103052 | * | 5/2008 |

OTHER PUBLICATIONS

Kim et al., "New insights into photoalignment of liquid crystals on coumarin-containing polymer films" Macromol. vol. 39(11) pp. 3817-3823 (2006).*

Belfield et al., "Photopysical and photochemical properties of 5,7-dimethyoxycoumarin under one and two photon excitation", J. Phys. Org. Chem., vol. 16 pp. 69-78 (2003).*

Trager et al., "Materials for interocular lenses enabling photocontrolled tuning of focal length in vivo", Proc SPIE vol. 6632 Articles 66321F (10 pages) (2007).*

Hartner et al., "Photopolymerized 7-hydroxycoumarin with improved solubility in PMMA: single-photo and two-photon induced photocleavage in solution and PMMA films", J Photochem. Photobio. A: Chem., 187 pp. 242-246 (2007).*

Fan et al. "Two-photon single beam multi-layers writing in anthracene derivatives", Proc. Spie 4930 pp. 240-244 (2002).*

International Search Report dated Jun. 22, 2011, corresponding to PCT/FR2011/050763.

* cited by examiner

REVERSIBLE RECORDING MEDIUM BASED ON OPTICAL STORAGE OF INFORMATION, METHOD OF REVERSIBLE RECORDING ON SUCH A MEDIUM

This invention relates to the technical field of the recording media.

The invention relates more particularly to the reversible recording medium based on optical storage of at least one piece of information within a support material, with the recording medium comprising at least one layer of support material comprising:

Molecules that have, in a local zone, a collective state of molecules among at least a first collective state of molecules and a second collective state of molecules;

The molecules that have the first collective state of molecules in the local zone being able to generate a second harmonic signal that is characteristic of this first collective state of molecules when they are excited by an electromagnetic reading radiation.

The invention also relates to a reversible recording process on the medium for recording data according to the invention.

Data-recording media comprising at least one layer of a support material are known from the state of the art, with said support material comprising molecules that have, in a local zone, a collective state of molecules among at least a first collective state of molecules and a second collective state of molecules.

Such recording media are, for example, known from the application PCT-A-WO99/23650, which describes an optical disk that comprises photochromes that are inserted in a matrix. The photochromes have two physico-chemical states. In a manner that is known in the art, these two physico-chemical states correspond to an open form of the molecule and to a closed form of the molecule. The modification of the physico-chemical state of the photochromes is done by a laser radiation that is strongly focused by two-photon absorption. The closed structure of the molecules is modified by this radiation in such a way as to produce molecules that are open locally.

It is known in the art that the two-photon absorption effect is a quadratic phenomenon based on the very localized intensity that therefore makes it possible to modify the state of the molecules with a high spatial resolution. The two-photon absorption therefore makes it possible to perform in-depth writing in the matrix that forms the disk.

The above-mentioned document also teaches that the two physico-chemical states of the photochromes have absorption bands far into the visible range, typically 450 nm for the first state and 530 nm for the second state.

This difference in the absorption properties therefore makes it possible to implement the reading of the disk. To do this, electromagnetic radiation is sent to the disk, and spectra and fluorescence emission are detected. The electromagnetic reading radiation is also focused in a precise manner on the layer to be read and on the reading zone of the layer. This is done by, for example, an excitation of two-photon fluorescence of the photochrome molecules.

Thus, a first adsorption characteristic will correspond to a bit "1," and a second absorption characteristic will correspond to a bit "0." The optical disk as described in the above-mentioned document therefore makes possible the storage of data.

However, the optical disk that is described in the above-mentioned document has the drawback that the two states of the photochromes have different stabilities. Thus, it is possible to ensure only that the photochromes of a given state have been voluntarily put into this state, or have returned to this state owing to instability of the antagonistic state. This therefore creates errors in the writing of the disk and consequently errors in its reading.

The spatial selectivity in a direction that is perpendicular to the surface of the disk is obtained by insertion of inactive intermediate layers of 30 microns of thicknesses separating the active layers with a thickness of 1 micron, thus limiting the information storage density.

It is also known from the document FR-A-2 900 762, which describes an optical data memory comprising at least one layer of a support material that is formed by charge-transfer molecules, more specially from the azobenzene family. These molecules have, in a local zone, a collective state of molecules from at least a first collective state of molecules for which said molecules have an orientation in a preferred direction and a second collective state of molecules for which said molecules have a random orientation.

Thus, only the molecules that have an orientation in a preferred direction are able to generate a second harmonic signal when they are excited in said local zone by an electromagnetic reading radiation.

According to this document, memory therefore makes it possible to distinguish the local collective states of molecules that are representative of the bits "0" or "1" by detection of a second harmonic signal relative to the wavelength of the electromagnetic reading radiation.

Actually, a preferred collective orientation of molecules in a local reading zone makes it possible to generate second harmonic radiation when they are excited by an electromagnetic reading radiation in this local zone. In contrast, a random orientation of the molecules does not generate this second harmonic radiation. It is therefore possible to read the memory according to the invention by detection of a second harmonic signal after excitation by a reading radiation in a local reading zone.

It is known that the phenomenon of second harmonic generation is a quadratic effect based on the intensity of the electromagnetic radiation. Owing to this quadratic effect, it is therefore possible to detect the second harmonic generation with a very good spatial resolution since the effects of molecules located outside of the focalization zone will be negligible relative to the effects of molecules of the focalization zone.

However, the memory and the reading and writing process on this memory have multiple drawbacks. Actually, if the writing process that consists in focusing a laser source in a local zone of the material so as to create a phenomenon of isomerization of the azobenzene molecules is reversible, this reversibility is difficult to implement. More particularly, to achieve the reversibility of the writing phase, it is necessary that the molecules that compose the support material undergo a new orientation so as to all be repositioned according to a preferred orientation. To do this, it is suitable to place the support material again under an intense electrical field, which may be difficult according to the applications under consideration.

Furthermore, the use of azobenzenes generates, during the reading process, a transfer of energy toward the azobenzene molecules, thus causing their movement. The recording is then not very robust when it is subjected to multiple reading phases.

Also known from the document JP-A-2005092074 is a recording method based on optical storage that is designed, on the one hand, to cause changes in the orientation of a compound that has suitable birefringent properties, and, on the other hand, to fix the compound in this orientation by chemical reaction so as to record a piece of information in the form of a modulation of the refraction index of said compound. To do this, the described method proposes using a crystalline compound of low molecular weight and having a polymerizable group, a compound that performs a two-photon absorption, as well as a polymerization initiator.

In addition to the drawbacks already mentioned, this recording method exhibits the drawback of allowing only a single recording. The proposed recording is therefore not reversible.

In a completely different field, the synthesis of a molecule made by grafting a coumarin skeleton onto a polymer chain is known from the document "*Coumarins in Polymers; from Light Harvesting to Photo-Cross-Linkable Tissue Scaffolds*" by Scott R. Trenor, Allan R. Schultz, Brian J. Love, and Thimothy E. Long (Chem. Rev. 2004, 104, 3059-3077).

This document describes how such a molecule has the capacity to react under the action of the light to implement a cyclization of the coumarin skeleton and to produce a cyclodimer. This physico-chemical process of photo-induced cyclodimerization of coumarin and its derivatives is, furthermore, well established today.

A first object of the invention is therefore aimed at producing a recording medium as well as a recording process making it possible to simplify the reversibility of the recording of data on a support material. More particularly, an object of the invention is to prevent the systematic use of an intense electrical field for erasing the data on the support material.

Another object of the invention is to produce a recording medium as well as a recording process making it possible to record data in an undetectable way by conventional linear measuring techniques. More particularly, an object of the invention is to implement the recording of data by modification of the non-linear physical properties of the material, without influencing a macroscopic standpoint on the linear physical properties of this material.

Another object of the invention is to produce a recording medium as well as processes and devices for reading and writing making it possible to distinguish more than two local collective states of the molecules for the purpose of modulating the non-linear response obtained by detection of the second harmonic signal. More particularly, it would be advantageous to implement a medium and a process for recording images composed of multiple tints that can be decoded according to a predetermined optical process without it being detectable to the naked eye.

For this purpose, the invention relates to a medium for reversible recording based on optical storage of at least one piece of information within a support material, with the recording medium comprising at least one layer of a support material comprising:
  Base molecules (M) that can take on, in a local zone (9), a
    first collective state ($EC_1$) of molecules (M, M');
    The molecules (M, M') that have the first collective state ($EC_1$) of molecules (M, M') being able to generate a first second harmonic signal ($SH_1$) that is characteristic of this first collective state ($EC_1$) of molecules (M, M') when they are excited by an electromagnetic reading radiation (10);
    The base molecules (M) that have the first collective state ($EC_1$) of molecules (M, M') being able to be transformed, at least in part, into transformed molecules (M') to pass into a second collective state ($EC_2$) of molecules (M, M') when they are excited by an electromagnetic writing radiation,
    The molecules (M, M') that have the second collective state ($EC_2$) of molecules (M, M') that are able to generate a second harmonic signal ($SH_2$) that is characteristic of this second collective state ($EC_2$) of molecules (M, M') when they are excited by the electromagnetic reading radiation (10).

According to the invention, the base molecules have a molecular structure that is based on a coumarin skeleton of the type:

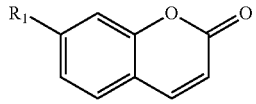

In which $R_1$ corresponds to a site of attachment of the coumarin skeleton with a polymer matrix.

This molecular structure is advantageous because the base molecule—the coumarin unit—and the transformed molecule—the cyclodimer that is obtained under the action of the electromagnetic reading radiation—have electronic characteristics that are very different from one state to another. In addition, another advantage comes from the fact that this molecular transformation has a good reversibility since the cyclodimer can be opened to reform the initial coumarin unit by simple UV irradiation in a narrow spectral band. In contrast, this molecular structure is advantageous because it makes it possible to prevent photons from being reabsorbed during the reading phase, which implies that multiple readings do not generate dimers accidentally. This is the case in particular for red and infrared spectral fields for which the commercial laser diodes are already available. In addition, since the absorption spectrum of these molecules is significantly less close to the visible than other molecules—such as the azobenzene molecules—the risk of accidental erasing of the data in the light and therefore the stability of films over time are increased.

According to one embodiment, the molecules have a molecular structure that is based on a coumarin skeleton of the type:

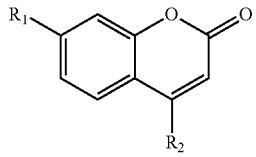

In which $R_2$ corresponds to a substituent.

According to one embodiment, the substituent R2 is a methyl group or a hydrogen atom.

According to one embodiment, the polymer matrix is a derivative of methacrylates of the form:

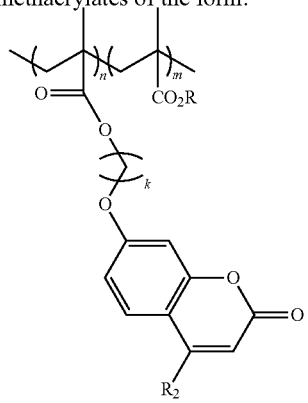

where: k, n and m are positive.

According to one embodiment, R is a methyl (CH3) or a butyl (n-C$_4$H$_9$), k is equal to 0, 2 or 6, and n/m varies from 1/1 to 1/5.

According to one embodiment, the base molecules are able to be transformed into molecules transformed by photo-induced dimerization.

According to one embodiment, the base molecules are able to take on, in a local zone (9), a collective state of molecules among n collective states of molecules, with n being an integer that is greater than or equal to 2; the molecules of each of the n−1 collective states of molecules being able to generate an n−1$_{th}$ second harmonic signal that is characteristic of this collective state of molecules (MM') when they are excited by an electromagnetic reading radiation.

Such an embodiment is advantageous because it makes it possible to modulate the non-linear response according to the different collective states of molecules. In this way, the recording support according to the invention makes it possible not only to store binary information, but also information with 3 bits, 4 bits, or in a general manner a piece of information with a dynamic over multiple bits. Thus, an image recording can be done on a medium that is invisible to the naked eye, that is invisible to the traditional linear imagery means, and that can only be read from a reading device as mentioned above.

According to another embodiment, each n collective state of molecules (M, M') is characterized by a characteristic level of base molecules (M) and transformed molecules (M').

According to another aspect, the invention also relates to a process for reversible recording on a recording medium by optical storage of at least one piece of information within a layer of a support material that comprises multiple stages that consist in:

Making base molecules take on a first collective state of molecules in a local zone;
With the molecules having the first collective state of molecules in the local zone being able to generate a first second harmonic signal that is characteristic of this first collective state of molecules when they are excited by electromagnetic reading radiation;
Selectively applying electromagnetic writing radiation at the level of at least one writing zone of said local zone, in such a way as to transform a portion of the base molecules having the first collective state of molecules into transformed molecules thus making the molecules that have the first collective state of molecules pass into a second collective state of molecules;
With the molecules having the second collective state of molecules being able to generate a second second harmonic signal that is characteristic of this second collective state of molecules when they are excited by the electromagnetic reading radiation.

According to the invention, the base molecules have a molecular structure that is based on a coumarin skeleton of the type:

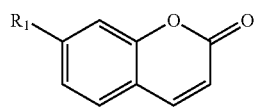

In which R$_1$ corresponds to a site of attachment of the coumarin skeleton with a polymer matrix.

According to one embodiment, the base molecules have a molecular structure that is based on a coumarin skeleton of the type:

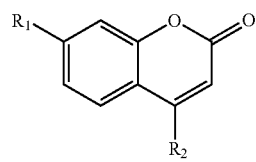

In which R$_2$ corresponds to a substituent.

According to one embodiment, the substituent R2 is a methyl group CH$_3$ or a hydrogen atom H.

According to one embodiment, the polymer matrix is a derivative of methacrylates of the form:

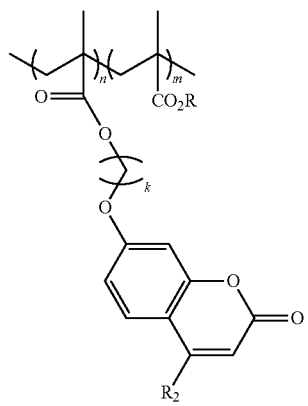

where: k, n and m are positive.

According to one embodiment, R is a methyl (CH3) or a butyl (n-C$_4$H$_9$), k is equal to 0, 2 or 6, and n/m varies from 1/1 to 1/5.

According to one embodiment, the electromagnetic writing radiation has a wavelength that is greater than 300 nm in such a way as to generate a photo-induced dimerization of the base molecules.

According to one embodiment, the base molecules have, in a local zone, a collective state of molecules among n collective states of molecules, with n being an integer that is greater than or equal to 2, with the process consisting in:
Selectively applying several forms of specific electromagnetic writing radiation at the writing zones,
With each specific electromagnetic writing radiation making said base molecules of the first collective state of molecules pass into transformed molecules to make each writing zone of the first collective state of molecules pass to one of the n collective states of molecules in the writing zone;
Such that the molecules of each of the n−1 collective states of molecules are able to generate an n−1$_{th}$ second harmonic signal that is characteristic of this collective state of molecules (M) when they are excited by an electromagnetic reading radiation.

According to the embodiment, the recording process comprises a stage that consists in:
Selectively applying electromagnetic erasing radiation at at least one erasing zone,
With the magnetic erasing radiation transforming at least a portion of the molecules that is transformed into base molecules.

According to one embodiment, the recording process comprises a stage that consists in:

Applying in a generalized way an electromagnetic erasing radiation at the transformed molecules,
With the magnetic erasing radiation transforming the molecules that are transformed into base molecules.

According to one embodiment, the electromagnetic erasing radiation is UV radiation.

Several embodiments of the invention are now described with reference to the accompanying figures in which.

In the figures above, identical references relate to similar technical elements. In particular, the base molecules used within the framework of this invention will be designated in a general way by the reference M while the transformed molecules will be designated by the reference M'. These molecules M, M' alternately can come in different collective states $EC_1$ of base molecules M by themselves, a combination of base molecules M and transformed molecules M', or transformed molecules M' by themselves. Thus, each collective state $EC_1$ of molecules is able to generate, when they are excited by an electromagnetic reading radiation, a second harmonic signal $SH_i$ that is characteristic of this collective state $EC_1$ of molecules and therefore separate from the second harmonic signal that can be generated by the other collective states of molecules.

Thus, according to a non-limiting embodiment, during an excitation by electromagnetic reading radiation:

The first collective state $EC_1$ of base molecules M generates a first maximum second harmonic signal $SH_1$,
The second collective state $EC_2$ of base molecules M in a large quantity and transformed molecules M' in a small quantity generates a second second harmonic signal $SH_2$ that is weakened relative to the first second harmonic signal $SH_1$,
The third collective state $EC_3$ of base molecules M in a small quantity and transformed molecules M' in a large quantity generates a third second harmonic signal $SH_3$ that is weakened relative to the second second harmonic signal $SH_2$, etc., and
The $n_{th}$ collective state $EC_n$ of molecules $M^{i'}$ generates an $n_{th}$ second harmonic signal $SH_n$, which is zero.

According to an alternative embodiment, the molecules come either according to a first collective state $EC_1$ of base molecules M that, during an excitation by electromagnetic reading radiation, generate a first second harmonic signal $SH_1$ or according to a second collective state $EC_2$ of transformed molecules M' that, during an excitation by electromagnetic reading radiation, generate a second second harmonic signal $SH_2$.

Thus, the properties of each of the second harmonic signals that are measured—such as the intensity of these second harmonic signals—can be analyzed by deducing therefrom the collective state of the molecules $M^{i'}$ of the zone being considered.

Figure 1:
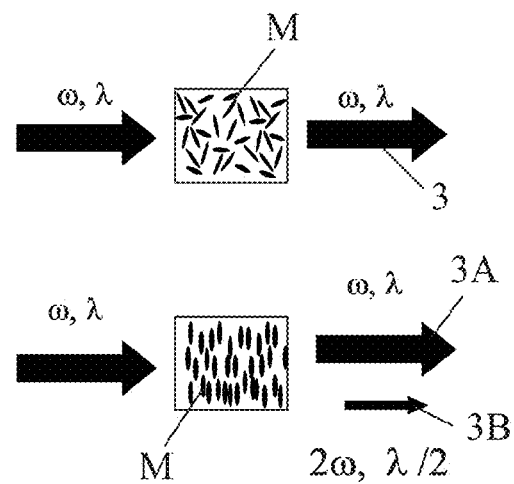
FIG. 1 is an illustration of the phenomenon of second harmonic generation due to the orientation of molecules through which a light beam passes.

FIG. 1 illustrates the phenomenon of second harmonic generation due to the collective state of base molecules M in a volume.

Illustrated in the upper portion of FIG. 1, when the base molecules M that are oriented randomly in a volume receive a light beam of wavelength λ, there is no creation of second harmonic radiation. The transmitted beam 3 therefore has the same wavelength λ as the incident beam.

Now illustrated in the lower portion of FIG. 1, when base molecules M that have a preferred collective orientation in a preferred direction receive a light beam of wavelength λ, a first beam 3A with a wavelength λ is transmitted, as well as a second beam 3B of half the wavelength λ/2 (or double frequency). The appearance of this beam of half the wavelength (or double the frequency) is characteristic of a second harmonic generation by molecules that are collectively oriented in a preferred way.

In a way that is known in the art, molecules that are oriented randomly in a local volume do not allow the generation of this second harmonic signal.

Figure 2:
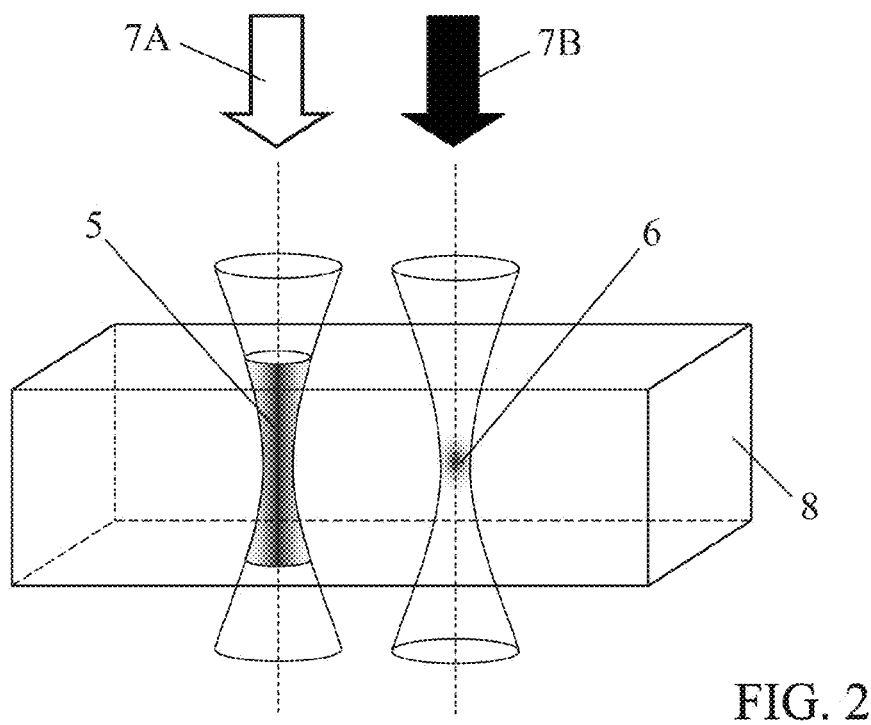
FIG. 2 is an illustration of the spatial selectivity of the two-photon absorption phenomenon in a material.

Now illustrated by FIG. 2 is the two-photon absorption phenomenon used within the framework of this invention. When a medium 8 is excited by a laser beam 7A that corresponds to an absorption wavelength of molecules of the medium 8, the excitation by one-photon absorption is localized on an extended zone 5, because the one-photon absorption phenomenon is a linear phenomenon.

In contrast, by excitation of the medium 8 with a laser beam 7B of suitable wavelength for two-photon absorption, the excitation by one-photon absorption is localized on a zone that is not very extended 6, because the two-photon absorption phenomenon is a quadratic phenomenon. Thus, it is possible to obtain a very good localization of the excitation zone of a medium by two-photon absorption of the molecules of the medium.

Figure 3A:
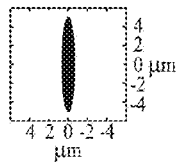
FIGS. 3A, 3B and 3C show the shapes of elementary volumes of zones or voxels, according to the invention, for a first digital opening of 0.3 of a writing laser beam.
Figure 3B:
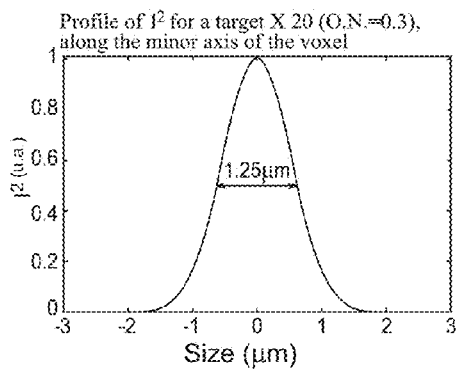
Figure 3C:
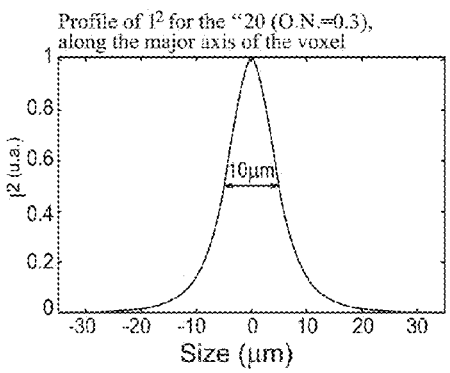

Illustrated in FIGS. 3A, 3B and 3C, the dimensions of the fluorescence emission zone in the form of a voxel for a digital opening target of 0.3 are shown for a two-photon absorption of fluorescent molecules that are excited by a laser.

FIG. 3A shows an oblong shape of the voxel that corresponds to the emission zone.

It is evident from FIG. 3B that the profile of the emission intensity has a characteristic length of 1.25 micrometers along the minor axis of the voxel in a plane that is perpendicular to the excitation beam. It is further evident from FIG. 3C that the profile of the emission intensity has a characteristic length of approximately 10 micrometers along the major axis of the voxel in the direction of the excitation beam.

Figure 4A:
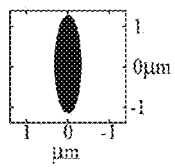
FIGS. 4A, 4B and 4C show the form of elementary volumes of zones or voxels, according to the invention, for a second digital opening of 0.6 of a writing laser beam.
Figure 4B:
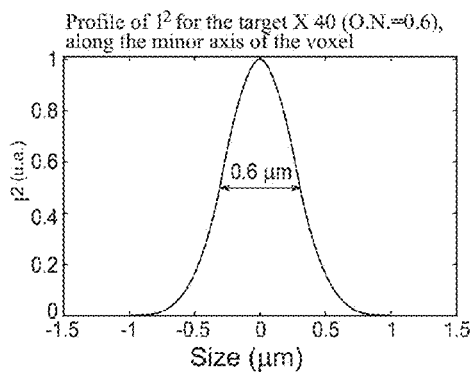
Figure 4C:
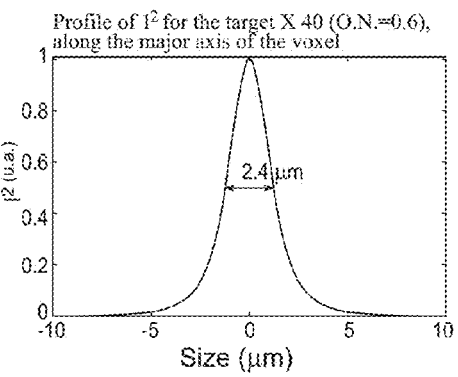

FIGS. 4A, 4B and 4C illustrate the same data for a digital opening target of 0.6.

This time, in FIG. 4B, the profile of the emission intensity has a characteristic length of 0.6 micrometer along the minor axis of the voxel in a plane that is perpendicular to the excitation beam.

In FIG. 4C, it is observed that the profile of the emission intensity has a characteristic length of approximately 2.4 micrometers along the major axis of the voxel in the direction of the excitation beam.

This property of the two-photon absorption is known in the art and is described in a detailed way in the work by Y. R. Shen, "The Principles of Nonlinear Optics," Wiley, New York, 1984. This invention advantageously uses the fact that the two physical phenomena of two-photon absorption and second harmonic generation are quadratic phenomena, which makes possible good spatial resolution of these phenomena.

Figure 5:
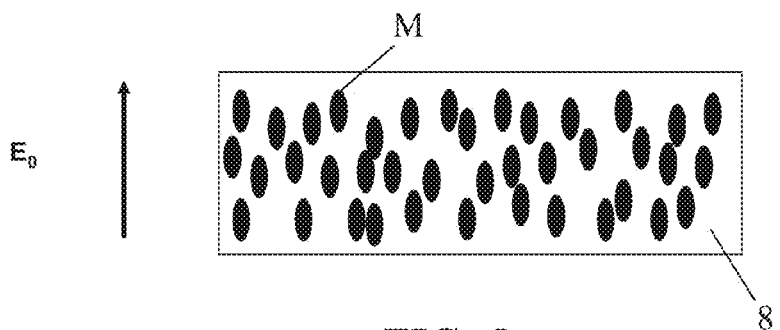
FIG. 5 shows a stage of a writing process according to the invention in which the molecules are oriented according to a preferred orientation in a recording medium according to the invention.

FIG. 5 illustrates a process for collective orientation in a preferred direction of base molecules M within the framework of this invention. According to the invention, base molecules M in a medium 8 are collectively oriented in a preferred direction.

The medium 8 consists of a polymer matrix, functionalized by charge-transfer base molecules M called push-pull molecules that have a permanent dipole moment and a high quadratic hyperpolarizability. The charge-transfer base molecules M that are used within the framework of the invention advantageously have very different electronic characteristics according to the state of irradiation.

The base molecules M of the medium 8 comprise a molecular structure that is based on a coumarin skeleton that may or may not be substituted, grafted to a chain that consists of the polymer matrix. The base molecules M then have a form as presented below, in which R1 corresponds to a site for attachment of the coumarin skeleton with a polymer matrix.

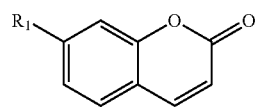

The coumarin skeleton that is used can be combined in particular with a derivative of methacrylates of the following form:

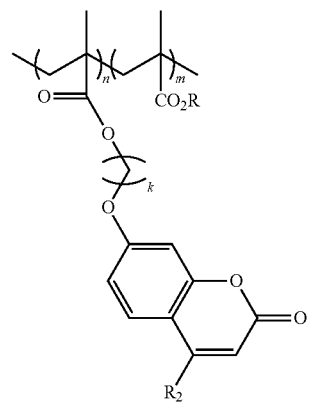

where:
R is a methyl ($CH_3$) or a butyl ($n\text{-}C_4H_9$);
k is equal to 0, 2 or 6;
n/m varies from 1/1 to 1/5; and
the substituent $R_2$ is a methyl group or a hydrogen atom.

It is advisable, however, to point out that these values of k and n/m could easily be modified to produce a medium and a process for recording according to the invention.

The base molecules M that are used for the implementation of the recording medium and the process according to the invention can also have a molecular structure that is selected from among the following examples:

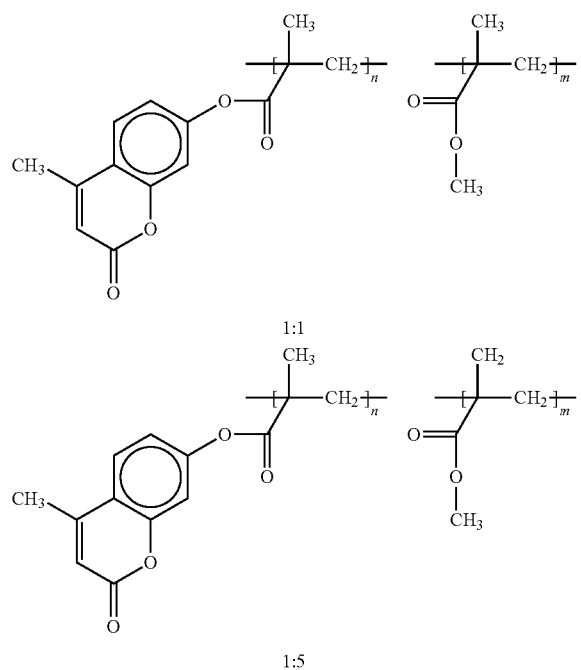

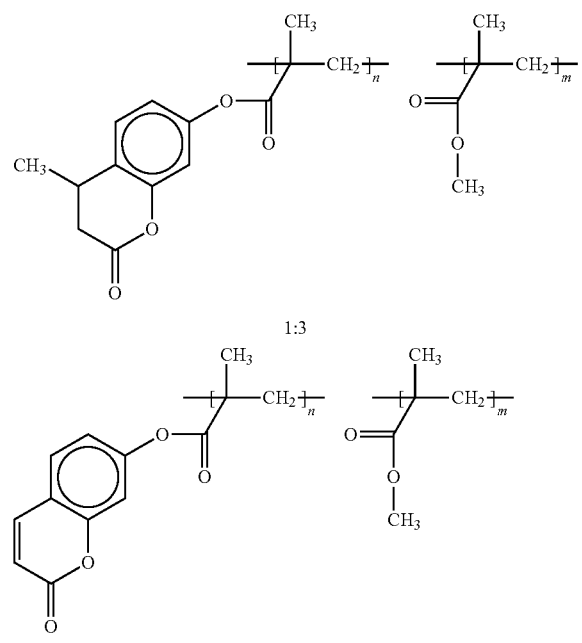

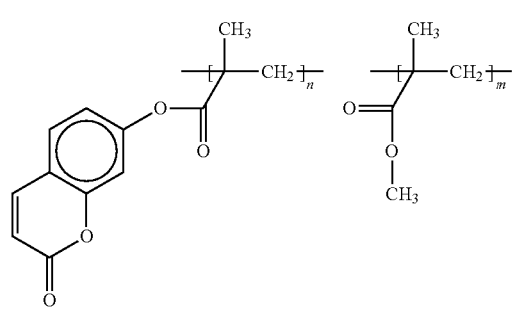
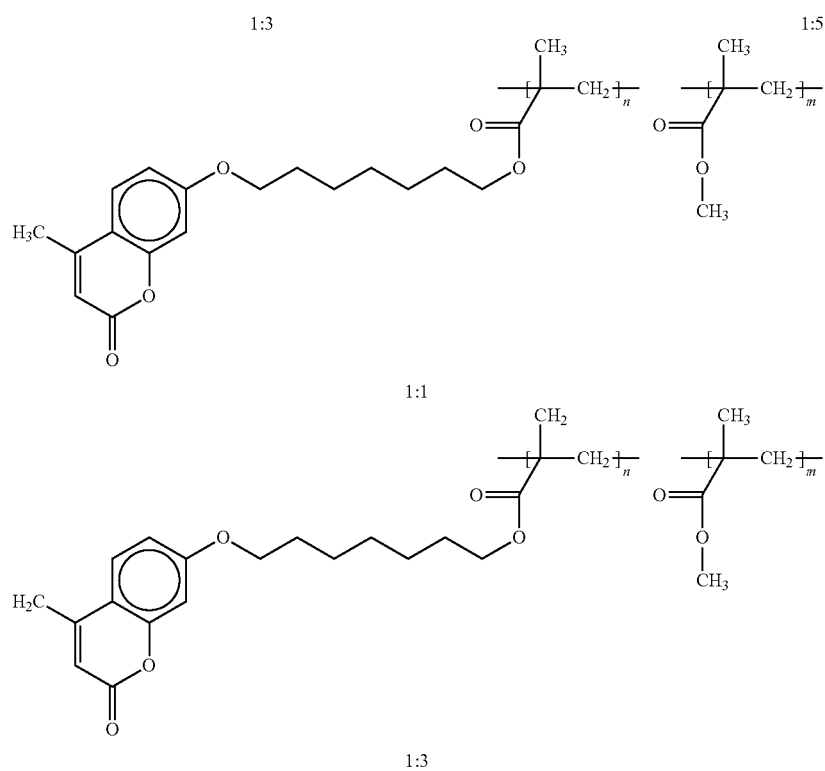

In an alternate way, the support polymer that is used for the implementation of the process according to the invention could also have a molecular structure that is different from that of a polymethacrylate.

These base molecules M have a high permanent dipole moment and can therefore be oriented under an electrical field. These base molecules M can also be functionalized with acrylate groups that make it possible to graft the charge-transfer chromophore to the polymer matrix and thus to ensure a better stability of the orientation that is fixed by photocrosslinking or photopolymerization.

The polymer that is used preferably has a high glass transition temperature Tg, i.e., higher than ambient temperature. Under the action of an electrical field Eo that itself has an orientation direction, the base molecules M are oriented in a preferred direction in the matrix 8 that is heated below the Tg. The electrical field Eo is applied using electrodes or by Corona effect and has an intensity of several kilovolts per millimeter.

According to a variant, the orientation of the charge-transfer molecules could also be implemented differently.

Once the base molecules M are oriented in a preferred direction, the matrix 8 is made rigid either thermally (or cooling under the Tg) in such a way as to fix permanently the orientation of the charge-transfer base molecules M in a preferred direction in the medium 8.

At this stage of the writing process, all of the base molecules M of the medium 8 are oriented in this preferred orientation thus defining a first collective state $EC_1$ of molecules M. If the optical memory comprises a number of layers, the molecules of all of the layers are oriented in this preferred orientation.

Figure 6:
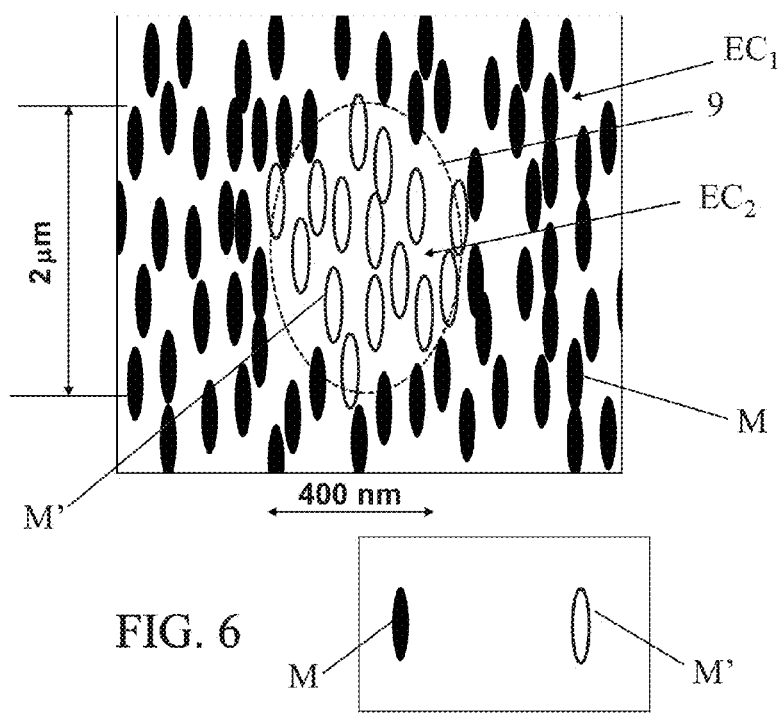
FIG. 6 shows a stage of a writing process according to the invention in which a portion of the molecules that are oriented according to the preferred orientation passes from a first collective state to a second collective state by a writing stage according to the invention.

FIG. 6 shows a modified local state of molecules according to a writing process of the invention.

According to a first embodiment of the invention, bits "0" are written in a medium 8 as mentioned above in which the base molecules M have all been oriented in a preferred direction according to a first collective state $EC_1$. In this first collective state $EC_1$, the base molecules M represent bits "1." The inscription of the bits "0" is done using a writing laser beam (not shown) that is focused in a writing zone 9 that forms a microvolume. The laser that is used is, for example, a femtosecond pulsed laser that can generate a two-photon absorption in volumes of microscopic size.

The writing laser beam is focused in the writing zone 9 in such a way as to generate a two-photon absorption as described above. In this way, the writing zone 9 is very localized and can have dimensions as described with references to FIGS. 3A to 3C or 4A to 4C, typically less than a cubic micron.

By the action of the focused writing laser beam, and by two-photon absorption, a portion of the base molecules M that were in the first collective state $EC_1$ pass into a second collective state $EC_2$ of tranformed molecules M' in the microvolume 9.

Figure 7:
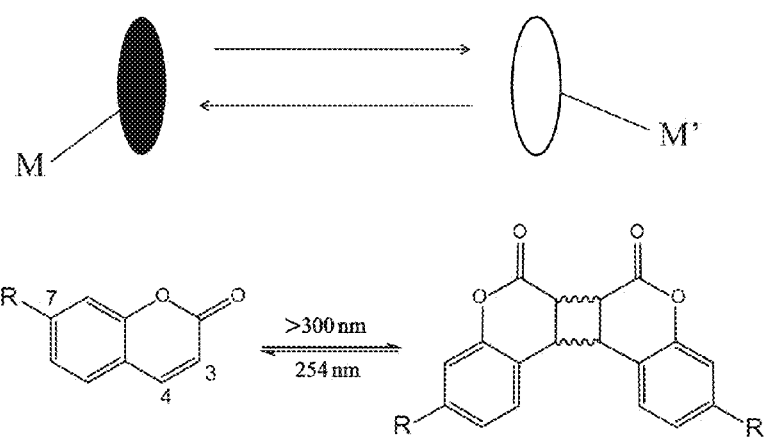
FIG. 7 shows an illustration of the photo-induced dimerization reaction that is used for writing in a memory according to the invention.

This effect is generated by a photo-induced cyclodimerization reaction [2+2] of the coumarin and its derivatives, whose reaction diagram is shown in FIG. 7.

Under the action of a light of a wavelength that is greater than 300 nm, similar to the one that is generated by the above-mentioned writing laser beam, a cyclization of the coumarin skeleton occurs to produce a cyclodimer that thus makes the base molecules M pass from the first collective state $EC_1$ to a second collective state $EC_2$ of transformed molecules M'. This reaction is advantageous in several respects. First of all, the coumarin skeleton and the product of its cyclodimerization have very different electronic properties, in particular in terms of the delocalization of feedstocks. Next, the cyclodimerization of the coumarin skeleton that is grafted to a polymer chain brings about a cross-linking of the polymer, with the result of a significant structural change within the material that characterizes the second collective state $EC_2$ of transformed molecules M'. In addition, a major advantage of this molecular transformation resides in the reversibility of the process, because the cyclodimerization product can be opened and reform the coumarin skeleton by UV irradiation at a wavelength of approximately 254 nanometers. The passage from the second collective state $EC_2$ of transformed molecules M' to the first collective state $EC_1$ of base molecules M is thus facilitated.

Figure 8:
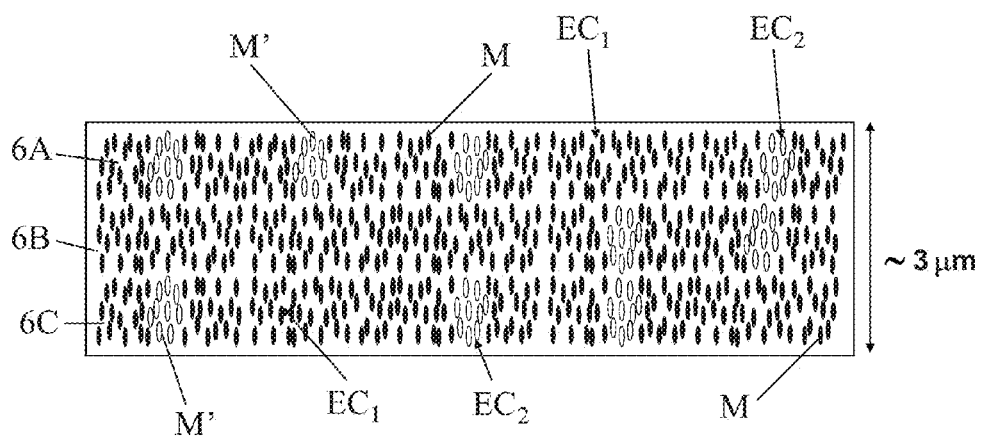
FIG. 8 shows three layers of a memory comprising molecules that have the first collective state and, locally, molecules that have the second collective state.

Illustrated in FIG. 8, three layers 6A, 6B, 6C of a medium 8 that comprises zones where base molecules M are in the first collective state $EC_1$ and zones where the transformed molecules M' are in the second collective state $EC_2$ are shown. This memory configuration that comprises three layers is obtained as described above by prior collective orientation in a preferred direction of all of the molecules of the three layers 6A, 6B, 6C and then by selective photodimerization of base molecules M in writing zones 9 by two-photon absorption.

The layers 6A, 6B, 6C therefore comprise different local zones, a first portion of these zones comprising base molecules M in a first collective state $EC_1$ corresponding to a preferred local orientation in the local zones, and a second portion of these zones comprising transformed molecules M' in a second collective state $EC_2$ of molecules that correspond to micro-volumes of writing zones 9 in which the photo-dimerization reactions take place.

The plans 6A, 6B and 6C are typically separated by several micrometers.

Figure 9:
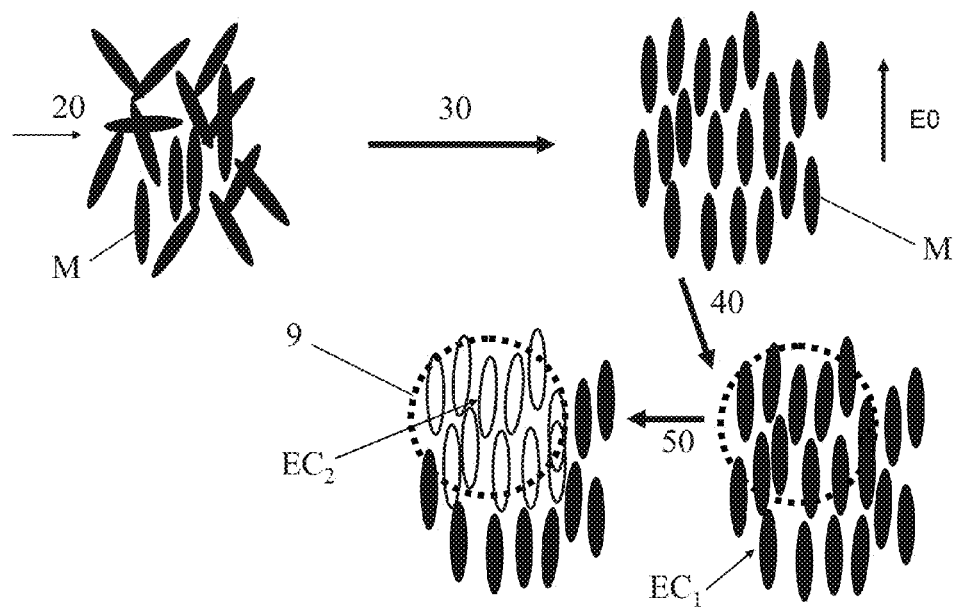
FIG. 9 shows all of the writing stages by modification of the collective state of a portion of the molecules according to the invention.

FIG. 9 illustrates the effect on charge-transfer molecules of the process for writing information according to the invention.

In a stage 20, base molecules M, preferably with charge transfer in a material 8, for example cross-linkable or polymerizable, are provided.

In a stage 30, these base molecules M are oriented in the entire material 8, for example under the action of an electrical field Eo. The base molecules M are next fixed in this first collective state $EC_1$ of molecules M, for example by rigidification of the material. In this first collective state $EC_1$, the base molecules M are able to generate a first characteristic second harmonic signal $SH_1$ since they are excited by an electromagnetic reading radiation.

In a stage 40, a writing beam is focused in a writing zone 9 by a two-photon absorption effect.

In a stage 50, the base molecules M react under the action of the writing beam to form transformed molecules M' that thus make the first collective state $EC_1$ pass into a second collective state $EC_2$ in the writing zone 9. As a result, in this writing zone, the transformed molecules M' generate a second second harmonic signal $SH_2$ that is weakened relative to the first second harmonic signal $SH_1$ that is generated by base molecules M that have the first collective state $EC_1$.

It should be noted that the means for monitoring the light beam positions based on writing bits "0" or "1" are known to one skilled in the art. The writing of a bit "0" requires in this case the application of the beam locally, and the writing of a bit "1" does not require the emission of the beam. The coding of "0" and "1" therefore correspond essentially to a succession of emission and non-emission of the writing laser beam.

In a reading stage, a reading beam will be transmitted with generation of a first second harmonic signal $SH_1$ for base molecules M in the first collective state $EC_1$ and without second harmonic generation—or else with generation of a second weakened second harmonic signal $SH_2$—for transformed molecules M' in the second collective state $EC_2$.

FIG. 10 to FIG. 14 illustrate a process for reading information inscribed on the disk in accordance with the writing process as described above.

Figure 10:
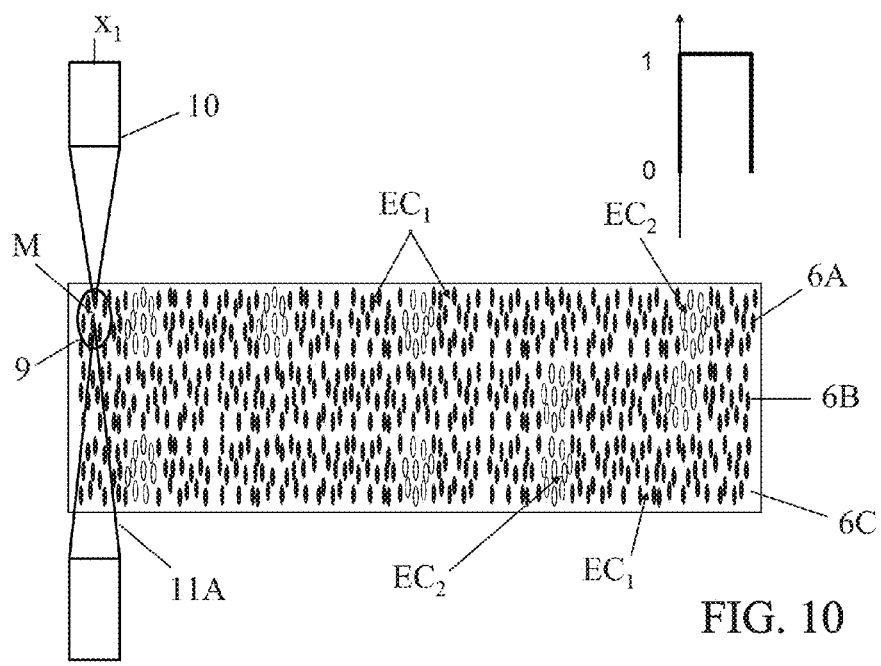
FIGS. 10 to 13 show stages for reading a three-layer memory according to the invention, as well as the binary view obtained.

FIG. 10 shows a memory according to the invention that comprises zones in which base molecules M are in a first collective state $EC_1$ and zones in which the transformed molecules M' are in a second collective state $EC_2$.

These zones are read successively by a reading laser beam 10 with a wavelength $\lambda$ that is positioned according to a position $x_1$. The beam that is transmitted by the passage of the incident beam at a reading zone 9 is then detected.

It is noted that the wavelength $\lambda$ of the writing beam may be equal to 700 nm. Thus, by two-photon absorption effect, the photons at $\lambda/2$ (350 nm) are absorbed by the base molecules M and this energy is used for the dimerization. By contrast, the reading beam 10 is advantageously implemented at 800 nm so as to generate a second harmonic signal at 400 nm. This is advantageous in that none of the photons at 400 nanometers are reabsorbed by the coumarin base molecules M because the latter are completely transparent above 360 nm. Therefore, multiple readings do not generate accidentally transformed molecules M'.

According to the invention, the second harmonic signals that are optionally generated by the molecules M are detected. As described above, the fact that phenomena for second harmonic generation and two-photon absorption are both quadratic effects makes it possible for the writing zone 9, which corresponds to the second collective state EC2 of the transformed molecules M', to be of a size on the order of the reading zone. This reduced size of the reading and writing zones is valid both in a normal plane in the reading laser beam 10 and in the direction of the reading laser beam 10, which makes possible reading and writing on several close layers 6A, 6B, 6C. The reading span and the writing span are therefore of a similar order of magnitude, which makes it possible to provide a writable and readable memory.

FIG. 10 illustrates the base molecules M in the reading zone 9 that corresponds to the zone for focusing the reading beam 10 the first collective state $EC_1$. A first second harmonic signal is therefore generated by the base molecules M in the zone 9. A transmitted beam 11A with a wavelength $\lambda/2$ is therefore detected. The detection of such a signal then corresponds to, for example, the coding of a bit "1." This is illustrated by, for example, the gap whose value is 1 in FIG. 10.

It is understood that the detection means of the second harmonic signal are known by one skilled in the art. In the same way, the electronic means for converting the detection or not of a second harmonic signal into a binary piece of information are also known to one skilled in the art.

Figure 11:
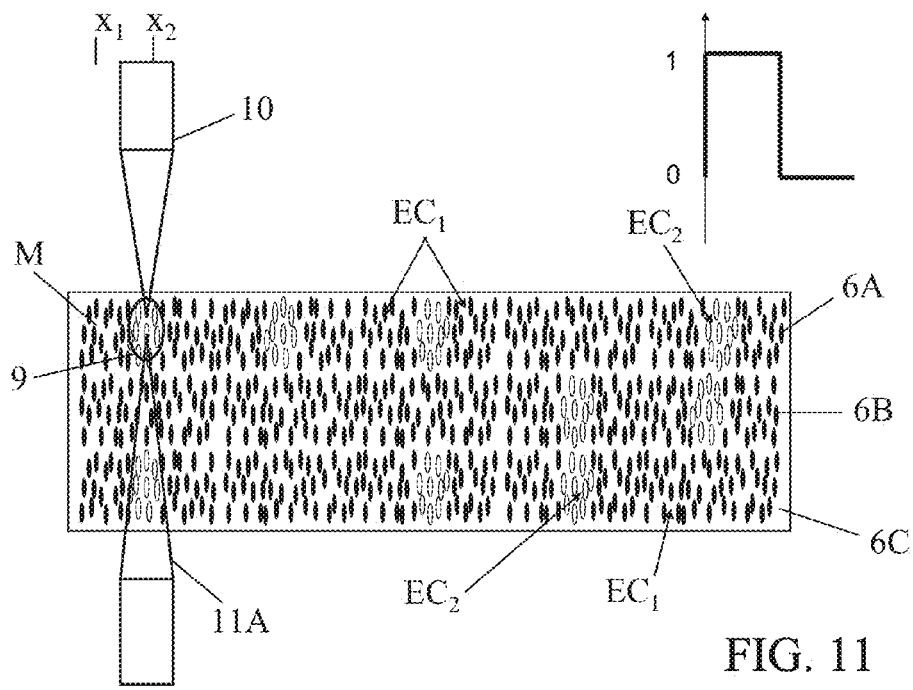

FIG. 11 illustrates an advance of the beam 10 in such a way as to successively read all of the data of the layers 6A, 6B, 6C. Between FIGS. 10 and FIG. 11, the reading laser 10 therefore has been moved from position $x_1$ to position $x_2$. The reading laser 10 can be moved, for example, in a reading direction by known mechanical means. The optical memory that comprises the layers 6A, 6B, 6C can also be moved relative to a stationary laser by known mechanical means.

In FIG. 11, the transformed molecules M' in the new reading zone 9 that corresponds to the zone for focusing the reading beam 10 are in the second collective state $EC_2$ within the new zone 9. No second harmonic signal—or a second second harmonic signal $SH_2$ that is weakened relative to the first second harmonic signal $SH_1$, generated by the base molecules M that are fixed in the first collective state $EC_1$—is generated by the transformed molecules M' of this zone 9. The transmitted beam 11B therefore does not comprise any component of wavelength $\lambda/2$ or else this component of wavelength $\lambda/2$ is weakened, which corresponds to, for example, a bit "0," as illustrated by the gap of FIG. 11 with the value 0.

Figure 12:
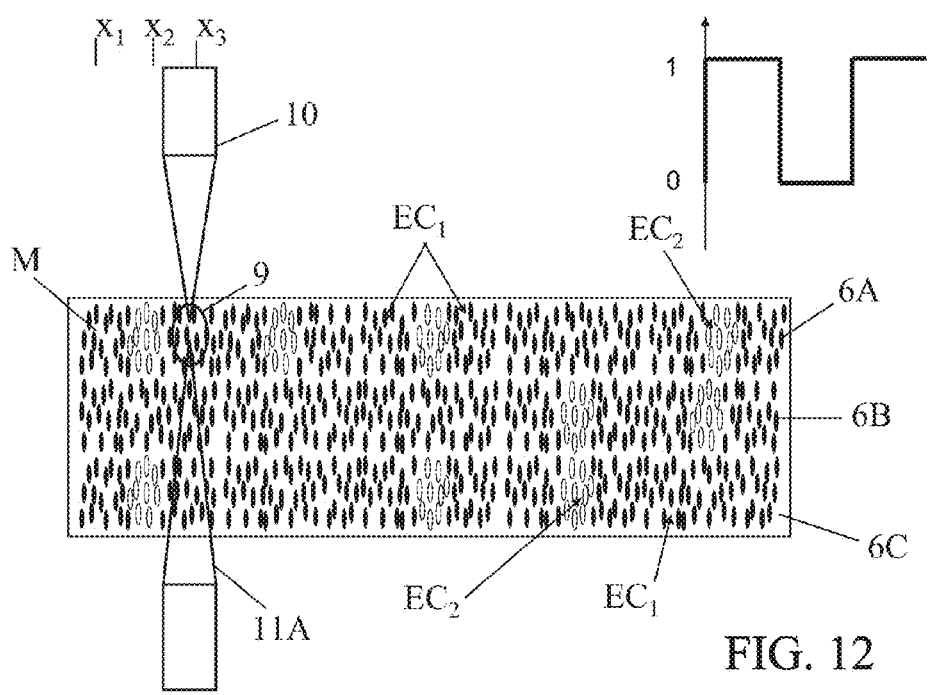

Illustrated in FIG. 12, the reading light beam 10 is offset on the memory toward a new reading zone 9 that corresponds to a position $x_3$ of the reading laser 10. This time, the base molecules M are in the first collective state $EC_1$ within the reading zone. A first second harmonic signal $SH_1$ is therefore generated by the base molecules M of this zone 9. A transmitted beam 11A of wavelength $\lambda/2$ is therefore detected, which corresponds to, for example, a bit "1," as illustrated by the gap of FIG. 12 with the value 0.

Figure 13:
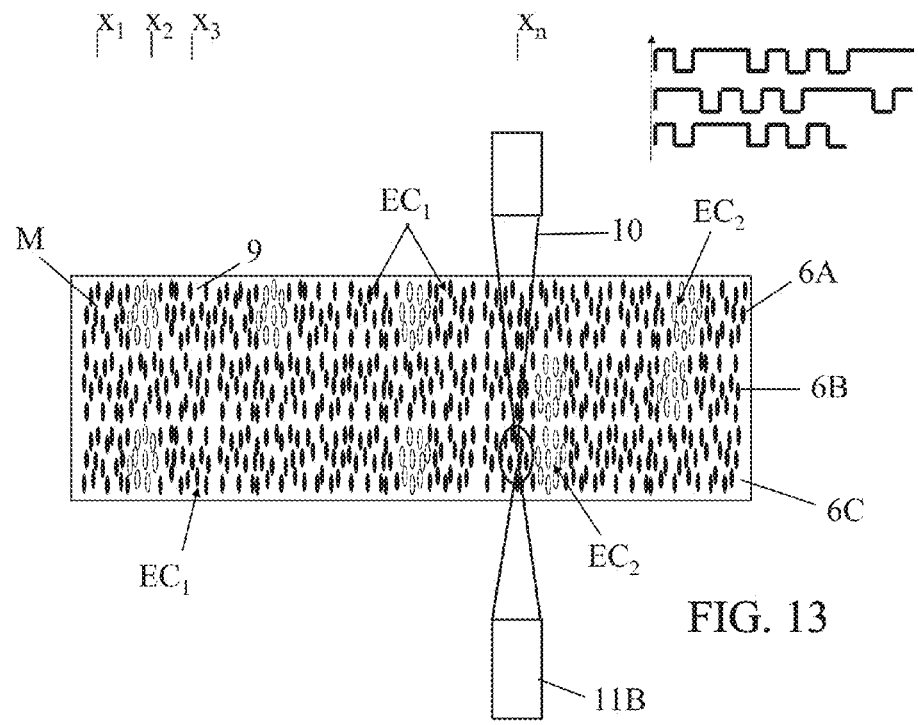
Figure 14:
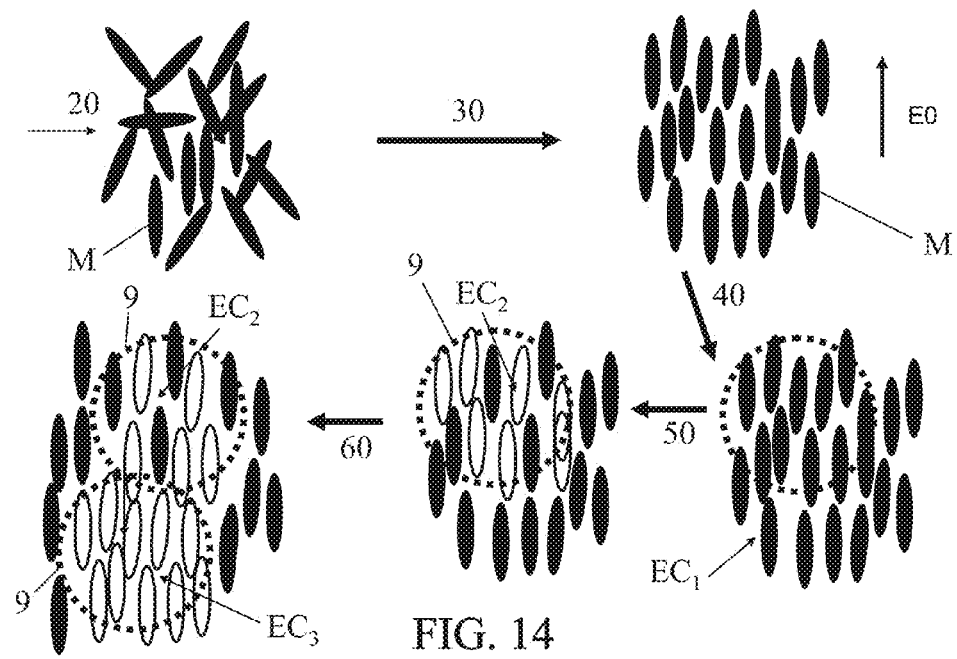
FIG. 14 shows all of the writing stages of an image by modification of the collective state of a portion of the molecules according to the invention.

All of the layers 6A, 6B and 6C of the memory according to the invention can then be read as described above. In particular, illustrated in FIG. 13, the reading laser beam 10 can be focused on any of the layers of the material comprising molecules M. The reading laser is positioned in a position $x_m$ on an axis, and an altitude $z_m$. In FIG. 13, the beam is focused on the layer 6C toward a reading zone 9, in which the transformed molecules M' are in the second collective state $EC_2$. As above, no second harmonic signal—or a second second harmonic signal $SH_2$ that is weakened relative to the first second harmonic signal $SH_1$ that is generated by the base molecules M fixed in the first collective state $EC_1$—is detected in the transmitted beam 11B, and a bit "0" is therefore read, as illustrated by the gap at the value 0 that corresponds to the third layer.

The recording medium as described above can be organized in a disk that comprises one or more layers. The different layers are then written upon as has been described above. According to the invention, the number of layers of the disk is limited only by the necessity of keeping the writing beam close to the writing zone 9. In particular, for a focal distance of the writing target on the order of 500 micrometers, it is possible to provide a memory that has one hundred layers of several micrometers of thickness.

The thus obtained recording medium thus makes possible an inscription by volume of bits of micrometric size.

It is noted that the recording medium described above can also be rewritable. Actually, when the UV rays irradiate the optical memory in general or else are focused on the transformed molecules M' having the second collective state $EC_2$, the latter regain the first collective state $EC_1$, and the recorded information is therefore eliminated. Thus, the elimination and the rewriting of information on the optical memory according to the invention are greatly facilitated. The application of the writing process according to the invention comprising successive stages of overall orientation of the molecules in a preferred direction and local disorientation based on the data to be written therefore makes it possible to rewrite in a memory according to the invention.

FIG. 13 shows another embodiment of the invention in which the recording medium makes it possible to record binary and quaternary information, etc.

Actually, the preceding embodiments mention only two separate collective states of molecules. However, according to one embodiment of the invention, the writing phase can be implemented in such a way as to modulate the response generated when the local zone is subjected to the reading beam 10.

According to this embodiment, and as above, charge-transfer base molecules M in a material 8 are provided in a stage 20.

In a stage 30, these base molecules M are oriented in the entire material 8, for example under the action of an electrical field Eo. The base molecules M are next fixed in this first collective state $EC_1$ of molecules M, for example by rigidification of material. In this first collective state $EC_1$, the base molecules M are able to generate a first characteristic second harmonic signal $SH_1$ since they are excited by an electromagnetic reading radiation.

In a stage 40, a writing beam is focused in a writing zone 9 by a two-photon absorption effect.

In a stage 50, after the base molecules M have all been oriented in a preferred direction according to a first collective state $EC_1$—in which the base molecules M represent bits "1"—the inscription of the bits produced by focusing the writing laser beam in the writing zone 9 can make it possible to encode bits "2," "3" up to "n," and therefore to modulate the non-linear response received during the reading phase. More particularly, only a portion of the base molecules M are passed into transformed molecules M'. Thus, the second collective state $EC_2$ of molecules is formed both from base molecules M and transformed molecules M', which makes it possible—when the base molecules M and the transformed molecules M' of this local zone are illuminated by a reading beam—to generate a second second harmonic signal $SH_2$ that is weakened relative to the first second harmonic signal $SH_1$ that is generated by the base molecules M having the first collective state $EC_1$.

To do this, the intensity and the focalization time of the writing laser beam in the pre-selected writing zones 9 are varied in such a way as to modulate the level of base molecules M photodimerized into transformed molecules M' in each of the writing zones.

Next, it is possible, during a new writing stage, to pass a local zone in a third collective state $EC_3$ of molecules by transforming a portion of the base molecules M of a zone that has a second collective state $EC_2$ into transformed molecules M'. Thus, in this writing zone, the level of base molecules M relative to the number of transformed molecules M' is reduced, and this collective state of molecules therefore generates a third second harmonic signal $SH_3$ that is weakened relative to the second second harmonic signal $SH_2$ that is generated by the molecules that have the second collective state $EC_2$.

Thus, a level of induced dimerization and consequently a level of base molecules M, on which the second harmonic signal that can be generated in this local zone depends, corresponds to each intensity level or to each time of exposure to constant intensity. Once this stage is calibrated, the principle always operates in the same way, and a predetermined collective state $EC_n$ of molecules corresponds to each characteristic second harmonic signal.

These writing stages can be repeated several times so as to generate n collective states $EC_n$ of molecules that can generate n separate second harmonic signals.

Thus, when the reading beam 10 is focused on the material 8, each of the n collective states of molecules generates an $n_{th}$ second harmonic signal that is characteristic of the recording that was carried out on the writing zone 9 that is being considered.

In this way, the recording medium according to the invention makes it possible not only to store binary information but also information with 3 bits, 4 bits, or, in a general manner, a piece of information with a dynamic over multiple bits. This embodiment is advantageous in particular within the framework of the recording of images. It is then possible to record an image on a medium that is invisible to the naked eye, that is invisible to the means of traditional linear imagery, and that can only be read starting from a reading device as mentioned above.

FIGS. 14a and 14b illustrate the implementation of such an image recording process.

Figure 15A:
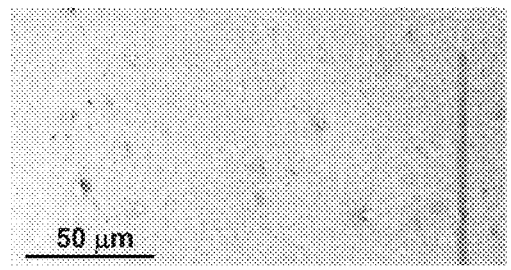
FIGS. 15a and 15b illustrate an embodiment of an image that is recorded on a support material that comprises molecules according to the invention.

FIG. 15a shows a material 8 that consists of base molecules M according to the invention that are placed in a first collective state $EC_1$ of base molecules M with a preferred orientation. As this FIG. 15a shows, a reading phase as described above was initiated in a first step, during which a reading beam 10 having a wavelength of 800 nanometers with a power of 5 mW made a blank image appear, and said image corresponds to a uniform second harmonic signal with the wavelength 400 nm.

Next, a writing phase was initiated as described above, starting from a writing laser beam that has a wavelength of 695 nanometers, a power of 26 mW, and an exposure time of between 1 millisecond and 1000 milliseconds according to the writing zones that are being considered.

Figure 15B:
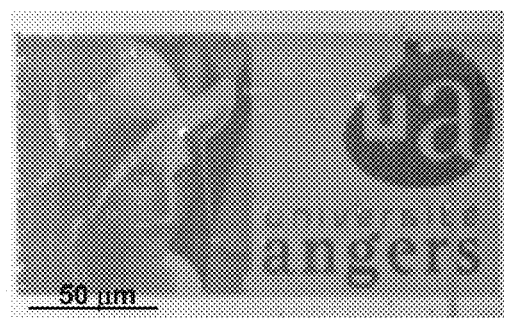

Then, the reading phase as described above was renewed under similar experimental conditions. This second reading phase made it possible to obtain the image that is shown in FIG. 15b.

It should be emphasized that the invention is not limited to the examples that are described above but on the contrary extends to any embodiment that can be implemented by one skilled in the art on the basis of this information.

In particular, the description mentions base molecules M having a coumarin skeleton as described above, but a mechanism that is similar to that of the invention could be used starting from different molecules that have similar properties. In particular, the recording medium as well as the recording process according to the invention could be implemented owing to other types of active molecules by second harmonic generation having the property of photodimerizing—in a reversible way—under the action of a light source of predetermined wavelength.

The invention claimed is:

1. A process for reading out a recording medium based on optical storage of at least one piece of information within a layer of a support material, said recording medium comprising:
base molecules (M) having a first collective state ($EC_1$) of molecules in a local zone that are able to generate a first second harmonic signal ($SH_1$) that is characteristic of the first collective state ($EC_1$) of molecules when the molecules are excited by electromagnetic reading radiation;
a portion of the base molecules (M) having the first collective state ($EC_1$) of molecules being transformed into dimerized molecules (M') by two-photon absorption thus making the molecules that have the first collective state ($EC_1$) of molecules pass into a second collective state ($EC_2$) of molecules;
the molecules having the second collective state ($EC_2$) of molecules being able to generate a second harmonic signal ($SH_2$) that is characteristic of this second collective state ($EC_2$) of molecules when the molecules are excited by the electromagnetic reading radiation;
said process comprising the following step:
applying an electromagnetic reading radiation over said recording medium with a wavelength able to generate a second harmonic signal ($SH_2$) that is characteristic of the second collective state ($EC_2$) of the molecules,
wherein the base molecules (M) have a molecular structure that is based on a coumarin skeleton according to:

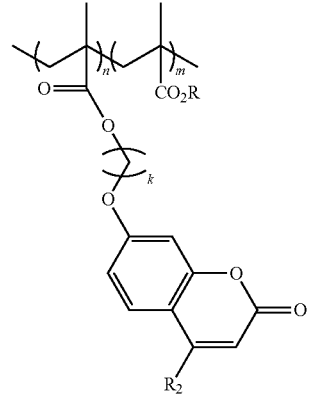

where: k, n and m are positive numbers, and R and $R_2$ are substituents.

2. A process for reversible recording on and reading out a recording medium based on optical storage of at least one piece of information within a layer of a support material comprising:
making base molecules (M) take on a first collective state ($EC_1$) of molecules in a local zone;
with the molecules having the first collective state ($EC_1$) of molecules in the local zone being able to generate a first second harmonic signal ($SH_1$) that is characteristic of the first collective state ($EC_1$) of molecules when the molecules are excited by electromagnetic reading radiation;
selectively applying electromagnetic writing radiation focused in a writing zone that forms a micro-volume of said local zone using a two-photon absorption, thereby transforming a portion of the base molecules (M) of said micro-volume having the first collective state ($EC_1$) of molecules into dimerized molecules (M') thus making the molecules that have the first collective state ($EC_1$) of molecules pass into a second collective state ($EC_2$) of molecules;
with the molecules having the second collective state ($EC_2$) of molecules being able to generate a second harmonic signal ($SH_2$) that is characteristic of this second collective state ($EC_2$) of molecules when the molecules are excited by the electromagnetic reading radiation;
applying an electromagnetic reading radiation over said recording medium with a wavelength able to generate a second harmonic signal ($SH_2$) that is characteristic of the second collective state ($EC_2$) of the molecules, wherein the base molecules (M) have a molecular structure that is based on a coumarin skeleton according to:

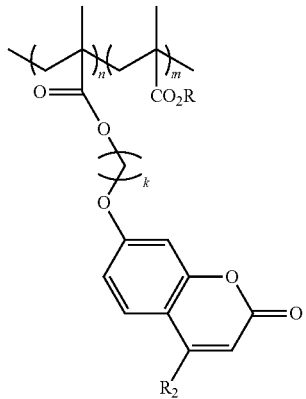

where: k, n and m are positive numbers, and R and $R_2$ are substituents.

3. The process for reading out a recording medium according to claim 1, wherein:

R is a methyl ($CH_3$) or a butyl (n-$C_4H_9$);

k is equal to 2 or 6; and n/m has a value of between 1/1 to 1/5.

4. The process for reading out a recording medium according to claim 1, wherein the $R_2$ is a methyl group or a hydrogen atom.

5. The process for reversible recording on and reading out a recording medium according to claim 4, wherein:

R is a methyl ($CH_3$) or a butyl (n—$C_4H_9$);

k is equal to 2 or 6; and n/m has a value of between 1/1 to 1/5.

6. The process for reversible recording on and reading out a recording medium according to claim 4, wherein the electromagnetic writing radiation has a wavelength that is greater than 300 nm in such a way as to generate a photo-induced dimerization of the base molecules (M).

7. The process for reversible recording on and reading out a recording medium according to claim 4, wherein the base molecules (M) have, in a local zone, a collective state of molecules (M) among n collective states ($EC_n$) of molecules, with n being an integer that is greater than or equal to 2, with the process comprising:

selectively applying several forms of specific electromagnetic writing radiation focused in the writing zones that form micro-volumes, using a two-photon absorption, thereby making said base molecules (M) of the first collective state ($EC_1$) of molecules pass into dimerized molecules (M') to make each writing zone of the first collective state ($EC_1$) of molecules pass to one of the n collective states of molecules in the writing zone;

such that the molecules of each of the n−1 collective states ($EC_{n-1}$) of molecules (M) are able to generate an n−$1_{th}$ second harmonic signal ($SH_{n-1}$) that is characteristic of the collective state ($EC_{n-1}$) of molecules (M) when the molecules (M) are excited by an electromagnetic reading radiation.

8. The process for reversible recording on and reading out a recording medium according to claim 4, further comprising:

selectively applying electromagnetic erasing radiation at least one erasing zone, with the electromagnetic erasing radiation transforming at least a portion of the dimerized molecules (M') into base molecules (M).

9. The process for reversible recording on and reading out a recording medium according to claim 4, further comprising:

applying in a generalized way an electromagnetic erasing radiation at the dimerized molecules (M'), with the electromagnetic erasing radiation transforming the dimerized molecules (M') into base molecules (M).

10. The recording process according to claim 9, wherein the electromagnetic erasing radiation is UV radiation.

11. The process for reversible recording on and reading out a recording medium according to claim 4, wherein the $R_2$ is a methyl group or a hydrogen atom.

* * * * *